United States Patent [19]

Lipinski

[11] Patent Number: 5,517,901
[45] Date of Patent: May 21, 1996

[54] LINEAR DRIVE HAVING PROFILE ELEMENTS PROVIDED ON FLANKS IN A LONGITUDINAL SLOT OF A GUIDE TUBE

[75] Inventor: Reinhard Lipinski, Plochingen, Germany

[73] Assignee: Machimpex Handels- und Consulting AG, Rotkruez, Switzerland

[21] Appl. No.: 371,557

[22] Filed: Jan. 11, 1995

[30] Foreign Application Priority Data

Jan. 11, 1994 [DE] Germany .......................... 44 00 453.2

[51] Int. Cl.$^6$ .................................................. F01B 29/00
[52] U.S. Cl. .......................................... 92/88; 277/DIG. 7
[58] Field of Search ............................. 92/88; 277/DIG. 7

[56] References Cited

U.S. PATENT DOCUMENTS

| Re. 34,049 | 9/1992 | Taki et al. ........................... | 92/88 |
|---|---|---|---|
| 4,685,383 | 8/1987 | Ruchser ........................... | 277/DIG. 7 |
| 4,829,881 | 5/1989 | Taki et al. ........................... | 92/88 |
| 4,991,494 | 2/1991 | Migliori ........................... | 92/88 |
| 4,998,459 | 3/1991 | Blatt ........................... | 92/88 |

FOREIGN PATENT DOCUMENTS

| 0104364 | 4/1984 | European Pat. Off. .................. | 92/88 |
|---|---|---|---|
| 0345506 | 12/1989 | European Pat. Off. . | |
| 2746718 | 4/1979 | Germany ........................ | 277/DIG. 7 |
| 3807786 | 9/1988 | Germany . | |
| 8906987.0 | 9/1989 | Germany . | |

Primary Examiner—Thomas E. Denion
Attorney, Agent, or Firm—Foley & Lardner

[57] ABSTRACT

A linear drive without a piston rod has a guide tube closed on the end faces and with a piston mounted so as to be slidably displaceable therein. The guide tube is provided with a longitudinal slot over its entire length. A web connected to the piston and used for guiding out forces projects through the longitudinal slot. Separate profile elements are provided in the longitudinal slot on its flanks and protect the flanks of the longitudinal slot against damage caused by the web.

20 Claims, 10 Drawing Sheets

LINEAR DRIVE HAVING PROFILE ELEMENTS PROVIDED ON FLANKS IN A LONGITUDINAL SLOT OF A GUIDE TUBE

BACKGROUND OF THE INVENTION

The invention relates to a linear drive having the features of a guide tube which has a longitudinal slot passing through its wall and in which a piston is mounted displaceably in the longitudinal direction.

Linear drives known from practice are so-called linear modules, in which a slide or piston is moved in an elongate, laterally slotted guide tube via a pressure medium or pull means. The slide or piston is connected firmly to a web which passes through the longitudinal slot provided in the guide tube and which, if appropriate, in conjunction with a slide mounted externally on the guide tube, serves as a driven member.

Although this linear drive is provided simply for generating linear movements, there can occur, depending on the type of force generation and depending on the type of connected load, forces which act laterally on the web and which possibly bring the web into contact with the flanks of the longitudinal slot provided in the guide tube. This happens, for example, when loads engaging laterally on the web are not absorbed by additional, sufficiently rigidly designed guide means.

Moreover, a force acting laterally on the web can occur when a screw-spindle mechanism is provided as a pressure medium or pull means acting in the guide tube. Even when the external load is purely linear, this screw-spindle mechanism exerts a torque on the web which is thus pressed toward one of the two flanks of the longitudinal slot. When the web consequently touches the particular flank and executes a linear movement, it is possible for the flank of the longitudinal slot to be damaged thereby.

German Offenlegungsschrift 3,429,783 discloses a linear-drive cylinder actuated by pressure medium, which has a guide tube closed off on both sides and possessing a longitudinal slot in which a flexible sealing-off band is held fixedly. A piston is mounted slidably and in a sealed-off manner in the guide tube and passes with a web through the longitudinal slot. The linear-drive cylinder is provided on its outside with a slide which is designated as a guide plate and which is guided on specifically provided rails in the longitudinal direction of the linear-drive cylinder. The web passing through the longitudinal slot is connected firmly to the slide.

So that forces acting laterally on the driven member of the linear-drive cylinder can be kept away from the web, the slide displaceably mounted on the outside of the linear-drive cylinder has been provided, this signifying additional outlay in terms of production.

SUMMARY OF THE INVENTION

An object of the invention is to provide a linear drive which is relatively insensitive to forces engaging on the driven member and located outside the actual direction of movement and which can be produced cost-effectively.

The above-mentioned object is achieved by means of a linear drive comprising a guide tube having a longitudinal slot defined by mutually parallel flanks located opposite one another and by closing devices seated on end faces of the guide tube; a piston mounted in the guide tube and displaceable in a longitudinal direction; a web which passes through the longitudinal slot and which is connected to the piston; a profile element having a run-on portion and provided on each flank of the longitudinal slot, the profile element projecting at least partially beyond a flank; wherein the run-on portion includes a run-on face such that when a lateral load is applied to the web in a direction of a flank, the web bears on the run-on face which forms an abutment and prevents the web from coming into contact with the flank.

Preferably, each flank includes at least one groove wherein a portion of a profile element is seated.

Advantageously, the run-on portion has low elasticity such that the web has firm bearing contact with and presses into the profile element only slightly thereby reducing friction which occurs as a result of flexing of the profile element during linear movement of the web.

In a preferred embodiment, the linear drive further comprises a sealing band for sealing the longitudinal slot wherein the profile element includes a catch portion for catching the sealing band.

In another preferred embodiment, the profile element includes a longitudinal rib which extends over a length of the profile element, the sealing band includes a longitudinal recess in a side of the sealing band facing a flank, and the longitudinal recess receives the longitudinal rib.

Further objects, features, and advantages of the invention will become apparent from the following detailed description taken in conjunction with the accompanying drawing.

BRIEF DESCRIPTION OF THE DRAWINGS

The drawing are hereby expressly made a part of the specification. Exemplary embodiments of the subject of the invention are shown in the drawings. In this.

DETAILED DESCRIPTION OF THE
PREFERRED EMBODIMENTS

The linear drive is largely insensitive to lateral loads engaging on the web. The run-on elements provided on the flanks of the longitudinal slot offer the web some lateral guidance and at the same time protect the flanks of the longitudinal slot. The web can thereby be used directly as a driven member, without the need for an additional outer slide guided on the guide tube. Under a lateral load acting on the web, the latter slides on the run-on element which, if there is an appropriate choice of material, undergoes at most little wear. It is possible, moreover, to use the linear drive in conjunction with a slide mounted slidably on the outside of the linear drive, in which case the web is fixed to the slide in the axial direction only, but has some play in the lateral direction. This avoids static redundancy between the piston mounted essentially free of play in the guide tube and the slide mounted essentially free of play on the outside of the guide tube.

If the web has lateral play on the slide, the slide and the piston are, in fact, uncoupled, so that, even without a relatively high outlay in terms of adjustment, there is no fear of any jamming of the linear drive. The lateral guidance of the web is taken over by the run-on elements, at least insofar as it is important to keep the web away from the flanks of the longitudinal slot. At the same time, the profile elements must satisfy only medium accuracy requirements, so that the profile elements can be cut to length from prefabricated endless profiles.

The profile element preferably extending over the entire length of the flank of the longitudinal slot can be held, for example positively, on the flank of the longitudinal slot. This can take place in a simple way by means of at least one groove which is provided in the flank of the longitudinal slot and in which the profile element is seated with one portion. It is thus held captive in the radial direction, in that it can be clamped or, for example, held integrally in the groove.

The run-on portion can be mounted fixedly in relation to the flank of the longitudinal slot. This is afforded, for example, if the run-on portion bears firmly on the flank of the longitudinal slot. The web then makes relatively firm bearing contact on the profile element and slides along on this, without the profile element thereby undergoing appreciable deformation.

However, the run-on portion can also be pretensioned resiliently away from the flank. The web passing through the longitudinal slot is then held resiliently, approximately centrally, by the corresponding run-on portions, the run-on portion constituting a firm abutment for the web only when it has been pressed by this onto the flank of the longitudinal slot or onto other fixed stops.

Especially reliable flank protection and good pressure distribution in the profile element are achieved if the run-on portion completely covers the flank. The stresses building up in the run-on portion even under relatively high lateral load on the web and the surface load on the run-on face facing the web remain within tolerable limits, so that only slight wear is to be expected.

If the elasticity of the run-on portion is low, the web has relatively firm bearing contact and presses into the profile element only slightly. This reduces a friction, otherwise occurring as a result of flexing on the profile element, during a linear movement of the web.

It is advantageous to make the run-on face plane. Surface contact between the web and the profile element is thus achieved. This applies particularly when the run-on face is arranged essentially parallel to the flank.

There can additionally be provided on the profile element a catch element, by means of which a sealing band sealing off the longitudinal slot can be caught. This affords the possibility of designing the linear drive as a cylinder actuated by pressure medium, on which the sealing band is held in the longitudinal slot without any further outlay.

A simple design of the catch element is obtained if the profile element has a longitudinal rib which extends over its entire length and which is assigned a longitudinal recess provided in the sealing band on a side facing the flank. The longitudinal rib at the same time forms the catch means, and it is possible, in principle, to utilize both the resilient flexibility of the sealing band and a resilient mounting of the longitudinal rib in order to bring about a catch effect. In the last-mentioned alternative, the longitudinal rib forming the catch element is mounted resiliently in the direction of the flank and is pretensioned resiliently away from the flank. This can be achieved by fastening the longitudinal rib to corresponding longitudinal ribs or tongues provided on the profile element.

The profile element can be produced from plastic, plastics having high wear resistance being particularly preferred.

Figure 1:
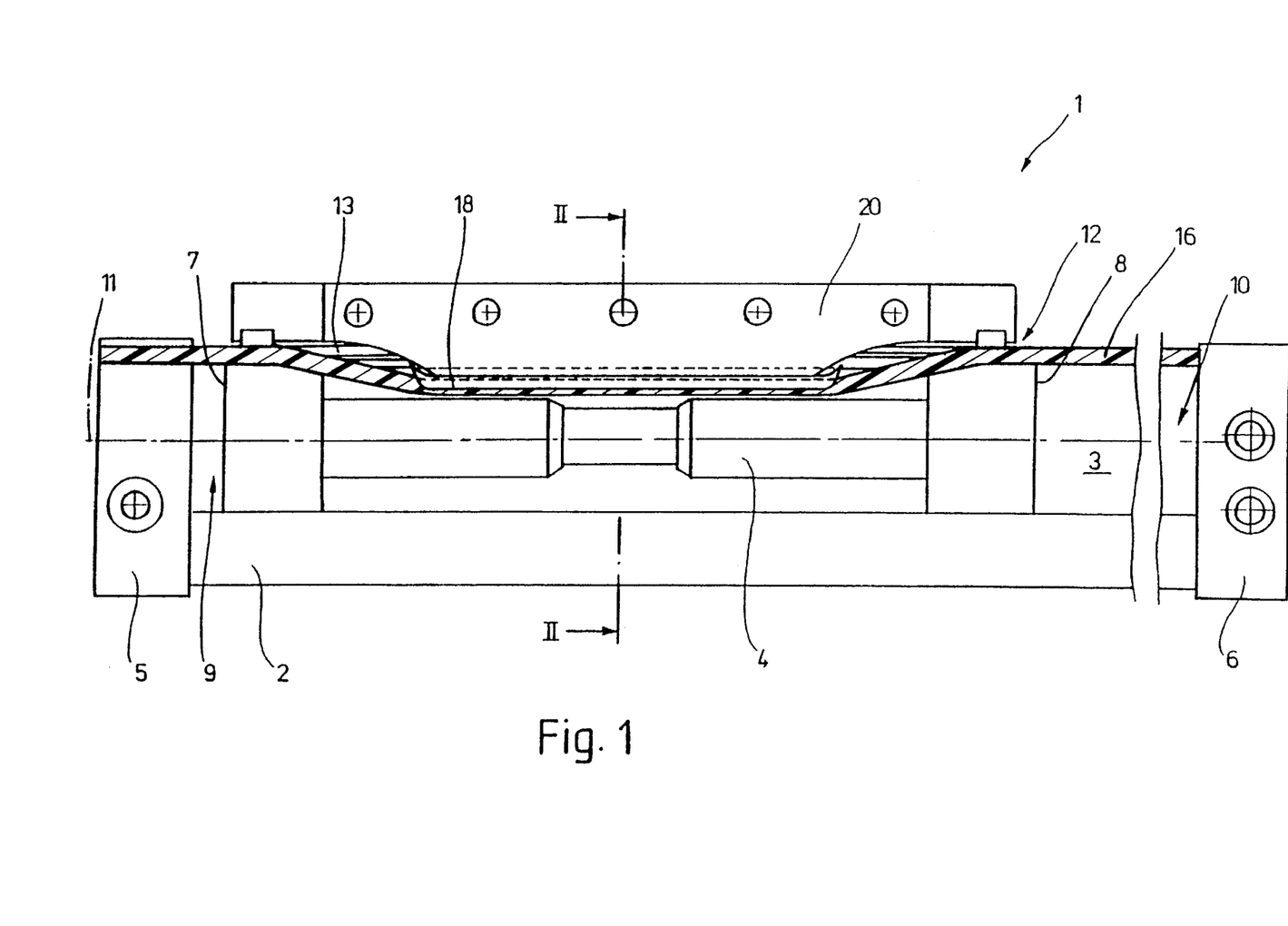
FIG. 1 shows a linear drive without piston rod, with a sealing band held by a profile element, in a side view and in a partially cutaway and diagrammatic representation.

The linear-drive module illustrated in FIG. 1 is a linear drive 1 without a piston rod, having a guide tube 2, in which a piston 4 sealed off relative to its wall 3 is mounted so as to be slidably displaceable. The guide tube 2 is closed on its end faces by means of respective covers 5, 6, so that the piston 4 delimits with its end faces 7, 8, the wall 3 and the covers 5, 6 two chambers 9, 10 which can be loaded with pressure medium, such as, for example, compressed air.

Figure 2:
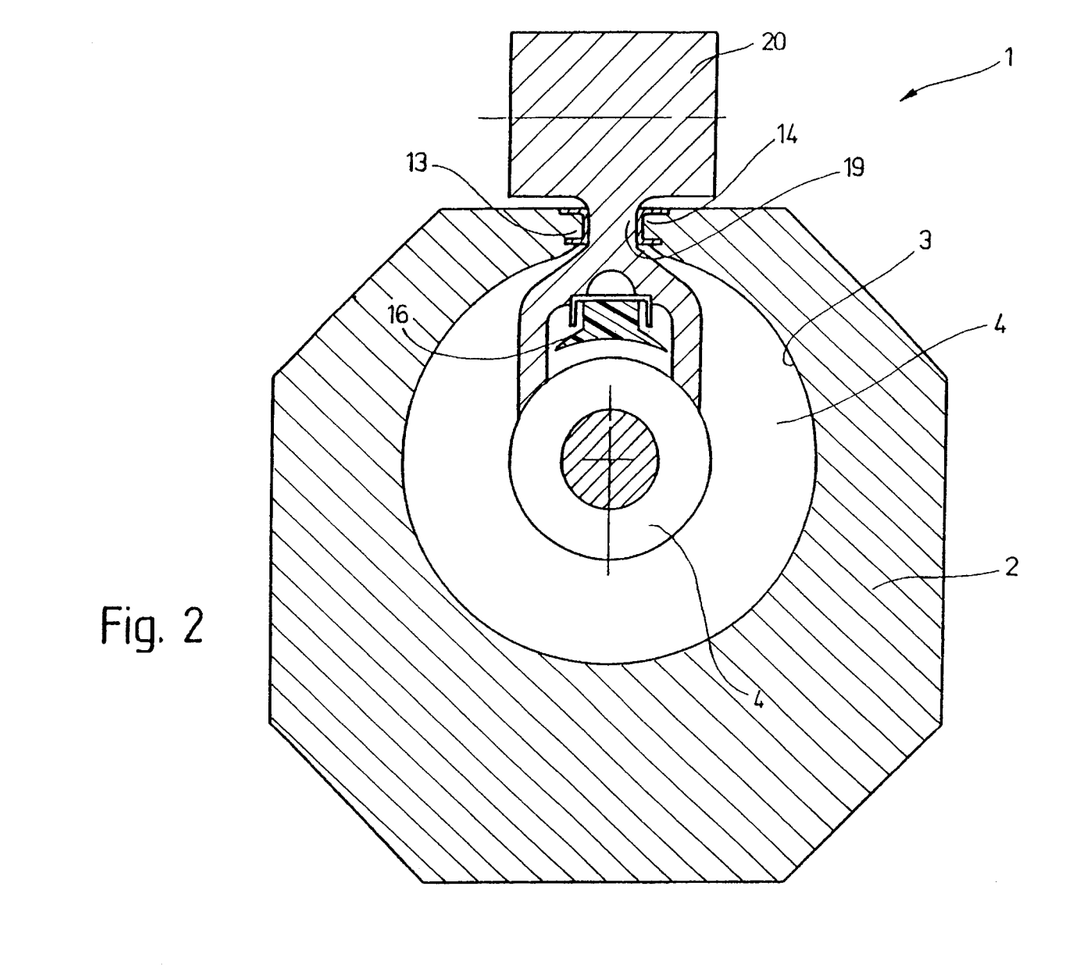
FIG. 2 shows the linear cylinder according to FIG. 1 in a sectional representation taken along the line II—II.

The guide tube 2 is provided with a longitudinal slot 12 which extends parallel to its longitudinal axis 11 and passes through the wall 3 and which is delimited by two mutually opposite flanks 13, 14 which run parallel to and at a distance from one another and which are evident especially from FIG. 2 and from the following figures.

The longitudinal slot 12 is closed by means of a sealing band 16 which is held at the ends near the covers 5, 6 and which seals off the chambers 9, 10 near the longitudinal slot 12 by means of a sealing lip 17 bearing on the wall 3 of the guide tube 2. The inward curvature of the sealing lip 17 is identical to the curvature of the wall 3, so that the piston 4 is seated in a sealed-off manner on the sealing lip 17 in the same way as on the remaining wall 3. In a middle region of the piston 4, the sealing band 16 is drawn inward from the longitudinal slot 12 by a guide device 18. As is evident from FIG. 2, there is provided in this region a forked web 19 which connects the piston 4 to an outer driven member 20 and through the fork of which the sealing band 16 is guided.

Figure 3:
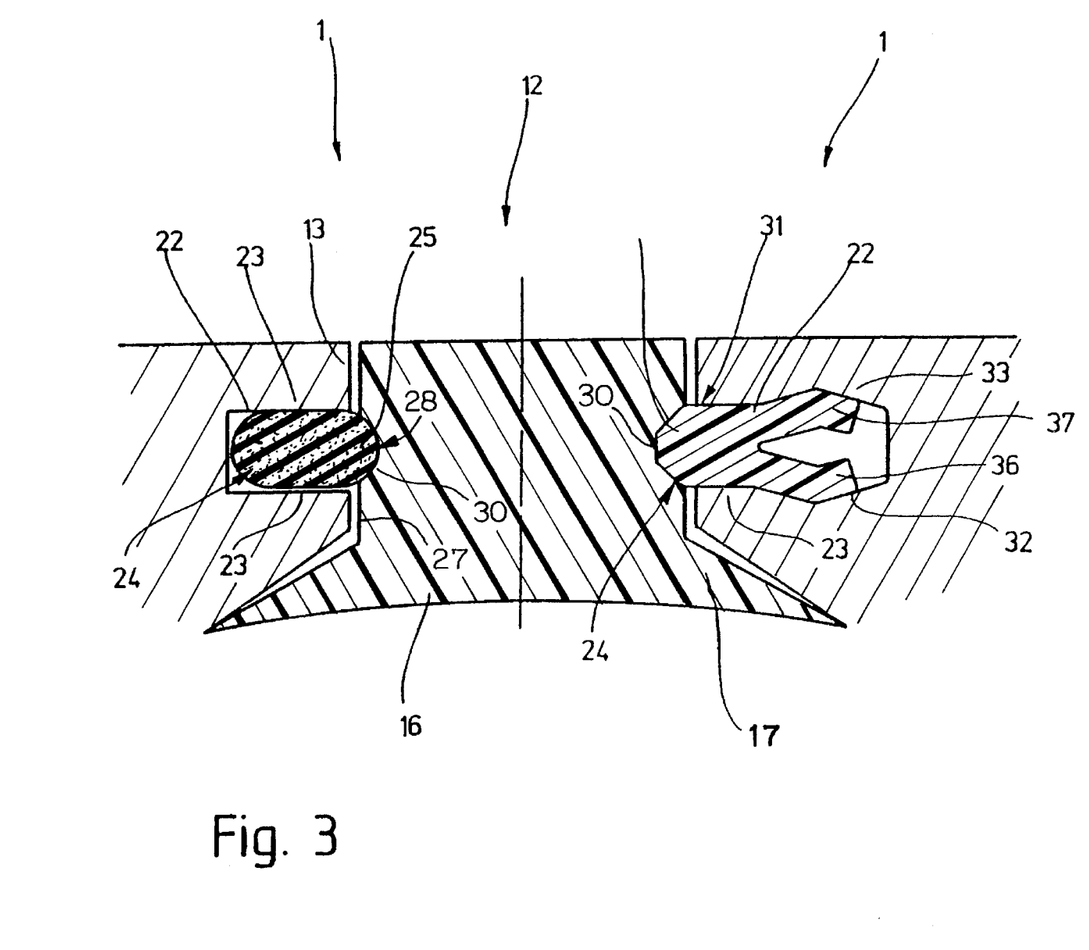
FIG. 3 shows the linear drive according to FIG. 2, with profile elements provided in the region of its longitudinal slot, in two different embodiments, in a cut-out representation and on an enlarged scale.

FIG. 3 shows in cut-out form two possible embodiments of the linear drive 1 which differ in terms of the design of the longitudinal slot 12 and of the sealing band 16. Both in FIG. 3 and in the remaining figures, one embodiment is shown in the left-hand half of the figure and a further embodiment is shown in the right-hand half of the figure. A feature common to all the embodiments is that a groove 22, in which a profile element 24 is held, is provided in each flank 13, 14. In all the embodiments, the cross-section of the groove 22 provided in the flank 13 is identical to the cross-section of the groove 22 provided in the opposite flank 14.

In order to allow easily understandable references, functionally identical parts and portions on different embodiments of the linear drive 1 bear the same reference symbols.

In the embodiment of the linear drive 1 shown on the left in FIG. 3, the groove 22 provided in the flank 13 is made rectangular. It has two mutually parallel side walls 23, between which the profile element of oval cross-section is held. The profile element 24 is made from a flexible sponge rubber and has a catch portion 25 which projects into the longitudinal slot 12 and which has a cross-section essentially in the form of a segment of a circle.

The sealing band 16 lying with an essentially rectangular portion 26' in the longitudinal slot 12 has, on its side 27 located near the flank 13, a longitudinal recess 28 which is identical in cross-section to the cross-section of the portion 25 and which is therefore likewise in the form of a segment of a circle.

In the linear drive 1 thus far described, a catching connection between the sealing band 16 and the guide tube 2 is formed by the profile element 24 located in the longitudinal recess 28. The sealing band 16 located outside the region occupied by the piston 4 is thus held in the longitudinal slot 12 to such an extent that the sealing lip 17 bears on the wall 3 and the chambers 9, 10 are thus leakproof.

Furthermore, the profile element 24 affords some lateral run-on protection. The catch portion 25 thus acts at the same time as run-on portion 30 which prevents the web from sliding along on the flank 13 and damaging the latter. However, at least in the case of a continuously flat web, the protective effect is somewhat slight and depends on the spring effect of the profile element 24. To reinforce the lateral run-on protection, the web 19 can be provided with a projection which is located at the same height as the profile element 24 and which is supported on the catch portion 25 of the profile element 24.

In the cutout of the linear drive 1 shown in the right-hand half of FIG. 3, the groove 22 is designed, in the vicinity of its mouth 31, with parallel flanks, and adjacently to the portion having parallel flanks it first widens away from the mouth 31 and then narrows again. Portions of the side walls 23 thus form mutually opposite bearing faces 32, 33 which form with one another an acute angle opening toward the mouth 31.

The profile element 24, the catch portion 25 of which is trapezoidal here, is inserted into this groove 22. Provided on the portion of this profile element 24 seated in the groove 22 are two legs 36, 37 which form an acute angle with one another and which are made resilient and bear on the corresponding bearing faces 32, 33 of the groove 22.

The profile element 24 is produced from a resilient plastic, so that, when the profile element 24 is pushed into the groove 22, the legs 36, 37 spring together and pretension the profile element 24 resiliently toward its position of rest shown in FIG. 3.

According to the cross-sectional shape of the catch portion 25, in this embodiment of the profile element, the longitudinal recess 28 provided in the sealing band 16 likewise trapezoidal in an identical way to the trapezoidal catch portion 25.

In this embodiment thus far described, the catch effect between the guide tube 2 and the sealing band 16 is likewise ensured by the effect of the profile element 24. In contrast to the exemplary embodiment shown on the left side of FIG. 3 and described above, however, the profile element 24 serving as a catch member is not deformed as a whole during the catching operation, but essentially only in the region of its legs 36, 37. Furthermore, the extent of deformation is smaller, so that a plastic of lower flexibility can be used. Moreover, this profile element 24 also affords lateral run-on protection. This is true especially when the web is provided with a lateral longitudinal rib supported on the profile element 24. In particular, at the point when the profile element 24 is pressed completely into the groove 22, so that the legs 36, 37 bear on the bottom of the latter, the profile element 24 is a firm abutment for the web 19.

Figure 4:
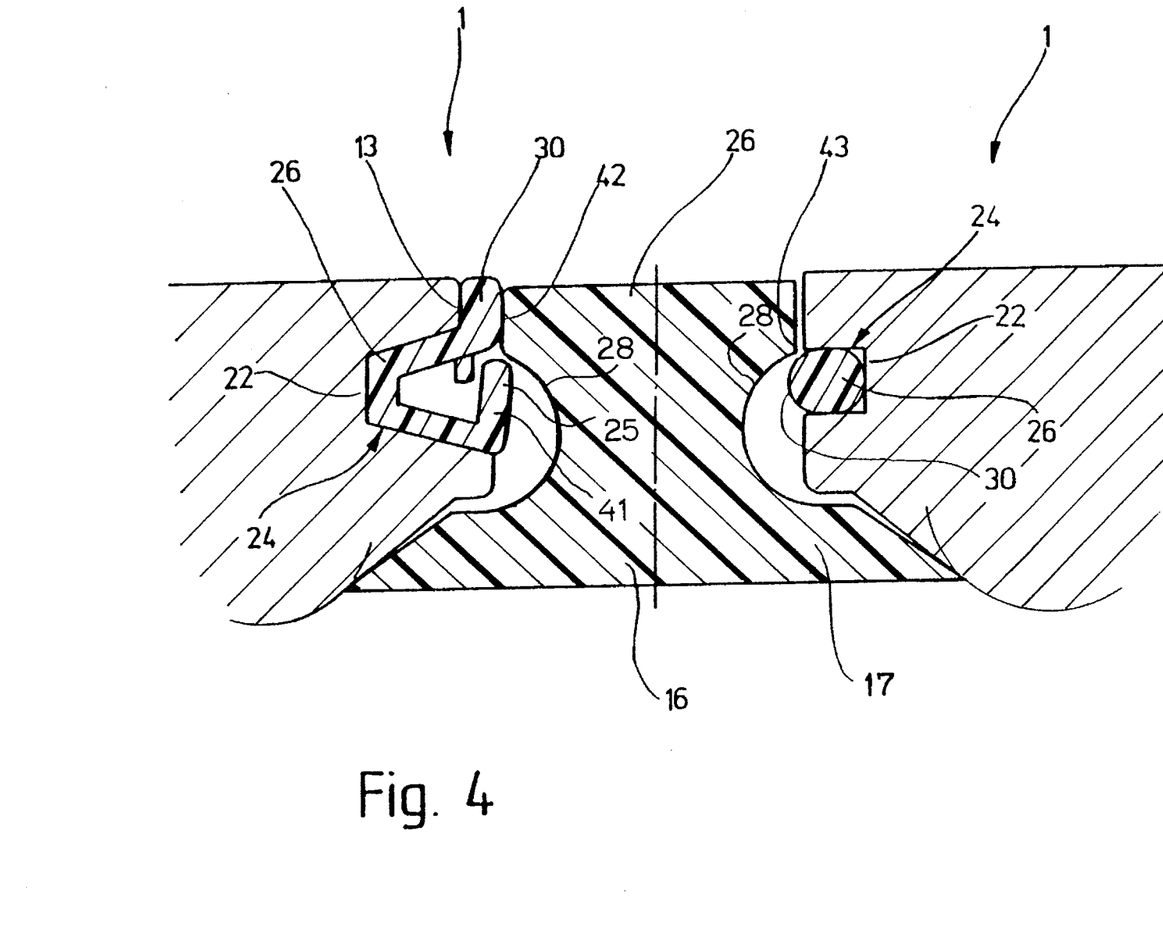
FIG. 4 shows the linear drive according to FIG. 2, with profile elements arranged in the region of its longitudinal slot, in two further embodiments.

In the linear drive 1 shown on the left in FIG. 4, the profile element 24 seated in a groove 22, trapezoidal here, has a run-on portion 30 separate from the catch portion 25. The catch portion 25 is a resilient tongue or lip 41 which is formed on the profile element 24 and which projects with a slight inclination relative to the flank 13 in the direction of the sealing band 16. A catching connection is thus formed in cooperation with the longitudinal recess 28 which, in this embodiment, is relatively deep, and as a result of the slight inclination of the lip 41 relative to the flank 13 the sealing band 16 can be introduced into the longitudinal slot 12 with little force. As soon as the lip 41 is located in the longitudinal recess 28, the sealing band 16 is firmly engaged in the longitudinal slot 12, so that a greater force is required in order to guide the sealing band 16 out of the longitudinal slot 12.

The separate run-on portion 30 bears on a somewhat set-back region of the flank 13 and projects into the longitudinal slot 12. It is dimensioned so that it bears on the portion 26 of the sealing band 16.

In this embodiment, especially good run-on protection is ensured by means of the profile element 24. The web 19, when it is loaded with a lateral force, comes to bear on the run-on portion 30 or, more precisely, on its run-on face 42 which is arranged essentially parallel to the flank 13. Because the run-on face 42 projects in relation to the flank 13 and the profile element 24 as a whole, and consists of relatively rigid material, the web 19 bearing on the run-on face 42 cannot touch the flank 13. The latter is thus effectively protected against damage.

The sealing band 16 is made straight, that is to say plane, on its inside facing the piston 4. It is therefore deformed, that is to say pressed outward, slightly by the piston running through under the sealing band 16. The inside of the sealing band 16 assumes the curvature of the piston 4. In order to ensure appropriate freedom of movement, the longitudinal recess 28 is given a relatively large dimension.

The exemplary embodiment of the linear drive 1 shown on the right in FIG. 4 corresponds largely to that shown on the left in FIG. 3. The difference is that the profile element 24 has an essentially round cross-section and the groove 22 a square cross-section. Furthermore, the recess 28 is substantially larger, so that, in the state of rest, the sealing band 16 bears only with an edge 43 on the profile element 24. Here too, as in the exemplary embodiment described above, the sealing band 16 is plane on its inside, so that it is pressed outward somewhat by the piston 4 running through. The longitudinal recess 28 allows a corresponding freedom of movement of the sealing band 16.

In this exemplary embodiment too, lateral run-on protection, albeit somewhat less pronounced, is ensured if a rib cooperating with the profile element 24, that is to say bearing on the latter, is provided on the web 19.

Figure 5:
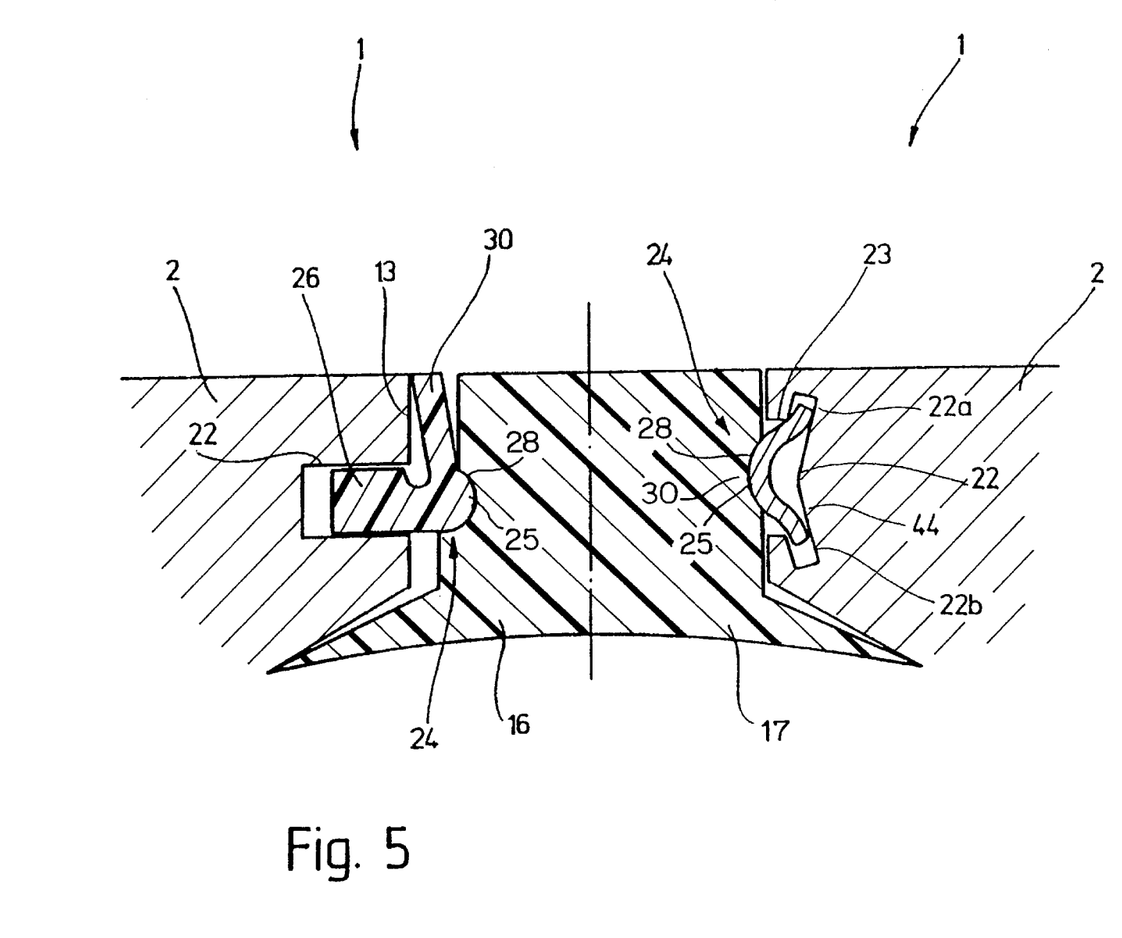
FIG. 5 shows the linear drive according to FIG. 2, with profile elements arranged in the region of its longitudinal slot, in two further embodiments.

In the linear drive 1 shown on the left in FIG. 5, a profile element 24 ensuring both a good catching effect and good run-on protection is used. The portion 26 located in the groove 22 is mounted displaceably in the direction of the perpendicular to the surface of the flank 13. The catch portion 25 is in the form of a segment of a circle and is located in the correspondingly shaped longitudinal recess 28. Starting from the catch portion 25, the resiliently designed run-on portion 30 extends from the groove 22 over the portion of the flank 13 adjacent to the groove 22 and covers said portion. The run-on portion 30 projecting obliquely away from the portion 26 in the position of rest is supported on the flank 13 and presses the catch portion 25 in the direction of the sealing band 16, so that the catch portion 25 lies firmly in the longitudinal recess 28.

The engagement and disengagement of the sealing band 16 take place in a similar way to the exemplary embodiments described above. Moreover, the run-on portion 30 ensures protection of the flank 13 against damage caused by the web 19 when the latter is pressed toward the flank 13. This is true particularly when the profile element is produced from a tough and wear-resistant plastic.

In the exemplary embodiment shown on the right in FIG. 5, the groove 22 is provided with undercuts. In particular, the groove 22 has two side walls which extend parallel to and at a relatively large distance from one another and in which mutually opposite grooves 22a, 22b, each of rectangular cross-section, are once again made. The grooves 22a, 22b form with their side faces a roof-like bottom 44 of the groove 22. The bottom 44 has two portions which are at an obtuse angle opening away from the groove 22 in relation to one another. The profile element 24 which, in the state of rest, is a U-shaped strip is supported on these portions of the bottom 44. Said U-shaped strip lies with its legs in the grooves 22a, 22b, with the result that it is spread open. The profile element 24 consists of a flexible material, such as, for example, plastic, or also of a resilient sheet-metal strip. As a result of its spring effect, the profile element 24 is pressed somewhat out of the mouth 31 of the groove 22, so that it projects with its catch portion 25 from the latter.

In this embodiment too, a catch effect between the sealing band 16 and the guide tube 2 and run-on protection are achieved, as in the exemplary embodiments described above.

Figure 6:
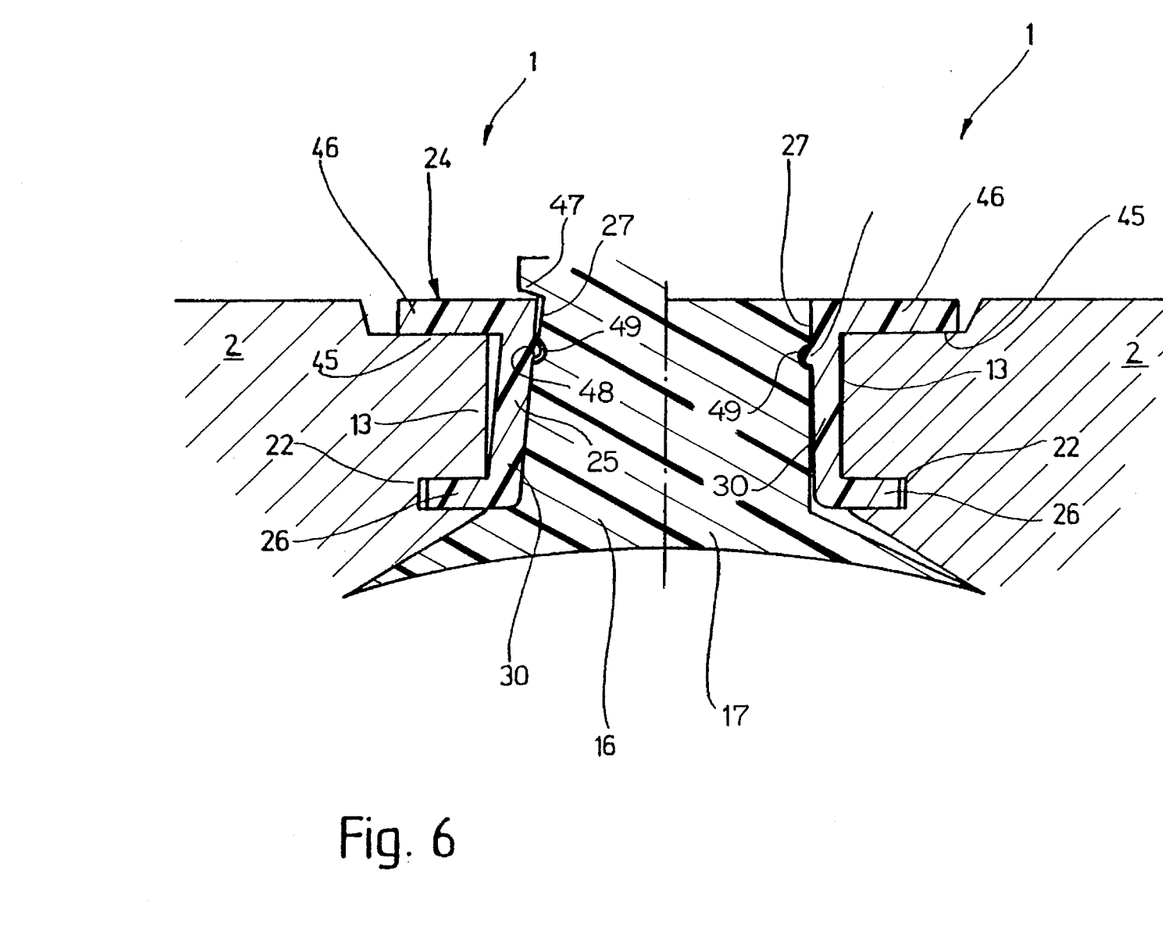
FIG. 6 shows the linear drive according to FIG. 2, in which the longitudinal slot has in its flanks two grooves, in which a profile element covering the flank is held, in two embodiments and in a cut-out diagrammatic representation.

FIG. 6 shows further exemplary embodiments, there being provided in the embodiment shown on the left, in addition to the groove 22, a second open-edged groove 45 which is arranged on the side of the flank 13 located opposite the groove 22. The profile element 24 has two portions 26, 46 which lie in the grooves 22, 45 and which are connected elastically to one another by means of the run-on portion 30. The run-on portion 30 covers the entire flank 13. In the state of rest, the portion 26 forms an obtuse angle with the run-on portion 30 and the portion 46 located in the open-edged groove 45 forms an acute angle with the run-on portion 30. As a result, in the region of the open-edged groove 45, the run-on portion 30 projects elastically in the direction of the sealing band 16, and at the same time it forms the catch portion 25.

The side 27 of the sealing band 16 is inclined relative to the flank 13 and, above the run-on portion 30, merges by means of a step 47 into a larger width. The inclined side 27 and the step 47 together delimit the longitudinal recess 28, in which the run-on portion 30 is located.

In this embodiment, especially good run-on protection is achieved on account of the complete covering of the flank 13 by the run-on portion 30.

In addition, for example to improve the sealing-off of the sealing band, there can be provided on the run-on face 42 of the run-on portion a longitudinally extending rib 48 of semicircular cross-section which is located in a corresponding longitudinal flute 49 provided in the side 27 of the sealing band 16.

The embodiment shown on the right in FIG. 6 is largely identical to that shown on the left, but the side 27 of the sealing band 16 runs parallel to the flank 13 of the longitudinal slot 12. The sealing band 16 is flush relative to the outside with the guide tube 2 and with the portion 46 of the profile element 24 located in the open-edged groove 45. The catch effect is brought about, here, essentially by the cooperation of the rib 48 with the longitudinal flute 49.

Figure 7:
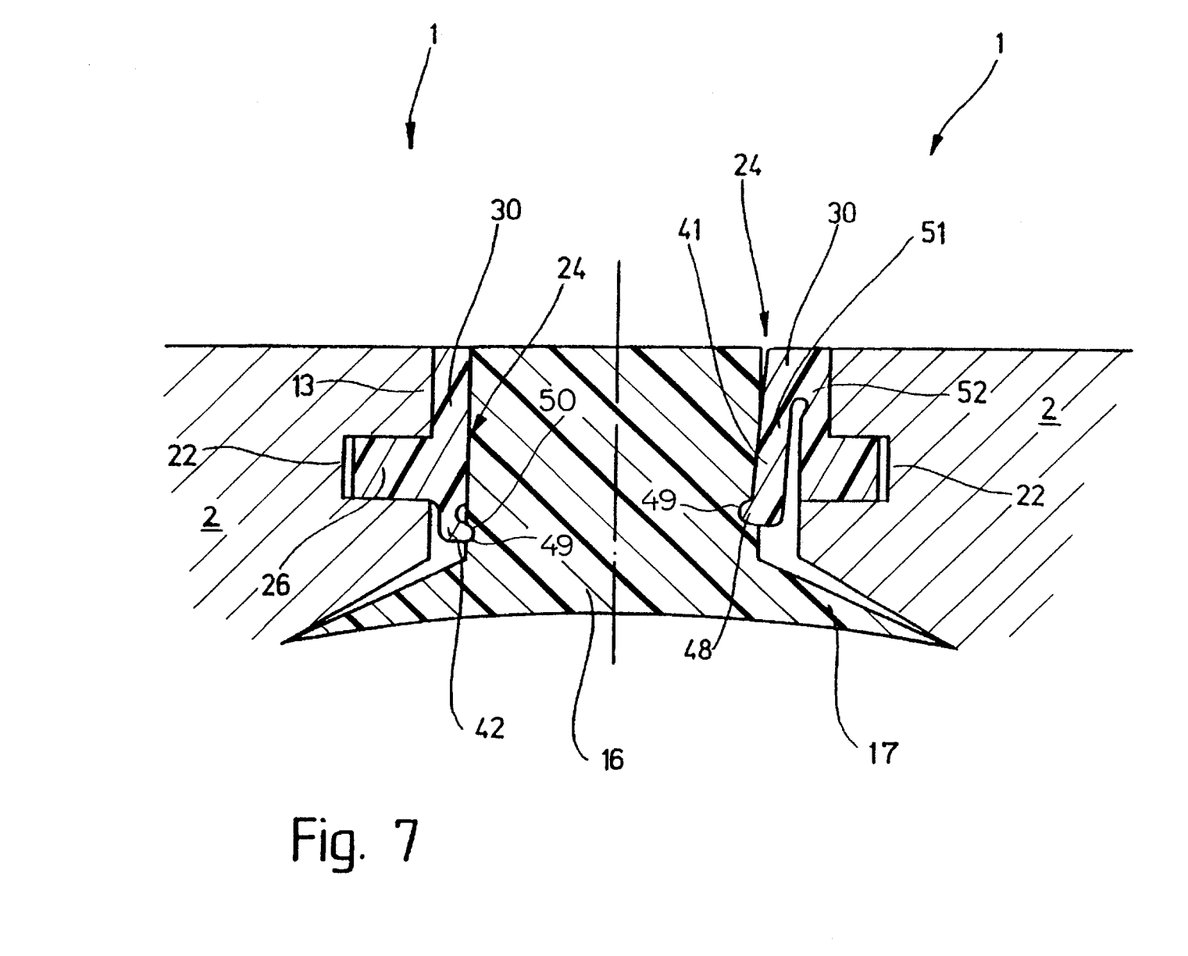
FIG. 7 shows the linear drive according to FIG. 2, in which the profile element seated in a groove has a resilient tongue for the retention of the sealing band, in two embodiments and in a cut-out diagrammatic representation.

The linear drive 1 shown on the left in FIG. 7 is largely identical in terms of construction to that shown on the left in FIG. 5, the run-on portion 30 bearing flat on the flank 13. The profile element 24, otherwise defining an angle profile in cross-section, is held positively in the rectangular groove 22 and is essentially fixed in relation to the guide tube 2. The catch effect is brought about by the catch lip 42 which is made very short here and which lies with a catch nose 50 in the longitudinal flute 49 provided in the sealing band 16.

Good run-on protection is achieved on account of the virtually complete covering of the flank 13 by the profile element 24, and the attainable catch effect can be varied by means of an appropriate design of the lip 42.

In the linear drive 1 shown on the right in FIG. 7, there is formed on the profile element 24 lying in the rectangular groove 22 a flexural spring 51, the first leg 52 of which bears flush on the somewhat set-back flank 13 and the other leg of which is formed by the lip 41 which is connected continuously to the leg 52 on the outside of the linear drive 1.

Figure 8:
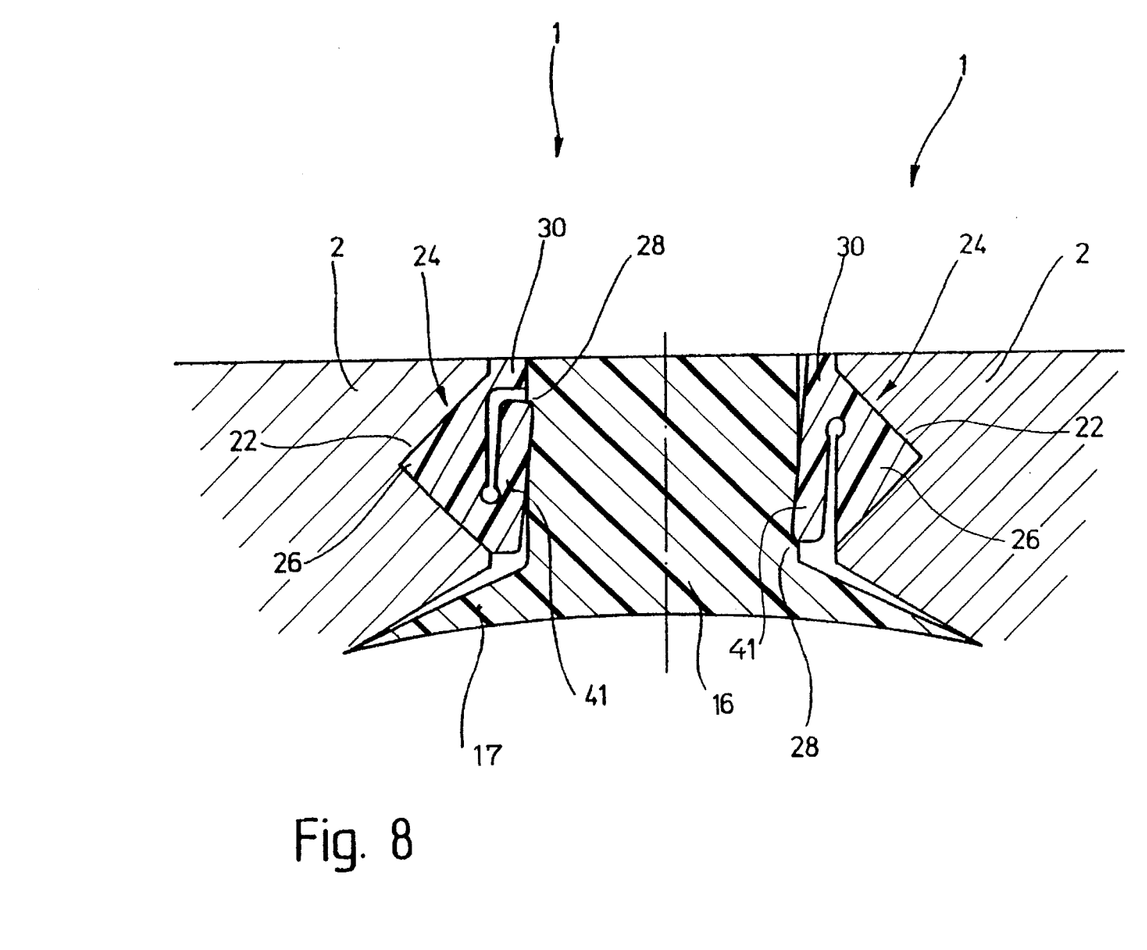
FIG. 8 shows the linear drive according to FIG. 2, in which the profile element seated in a groove has a resilient tongue for the retention of the sealing band, in two embodiments and in a cut-out diagrammatic representation.

Further embodiments of the linear drive 1 which ensure both a run-on protection and a catch function are shown in FIG. 8. The profile element 24 lies in the groove 22 which is designed with a triangular cross-section here and in which the likewise triangular portion 26 is seated. The latter can both be made solid, as shown, and be provided with a longitudinal groove which increases the elasticity of the portion 26. Here, the run-on portion 30 and the lip 41 are arranged on mutually opposite sides of the portion 26.

However, as shown on the right in FIG. 8, the lip 41 can also be directly connected elastically to the run-on portion 30.

Figure 9:
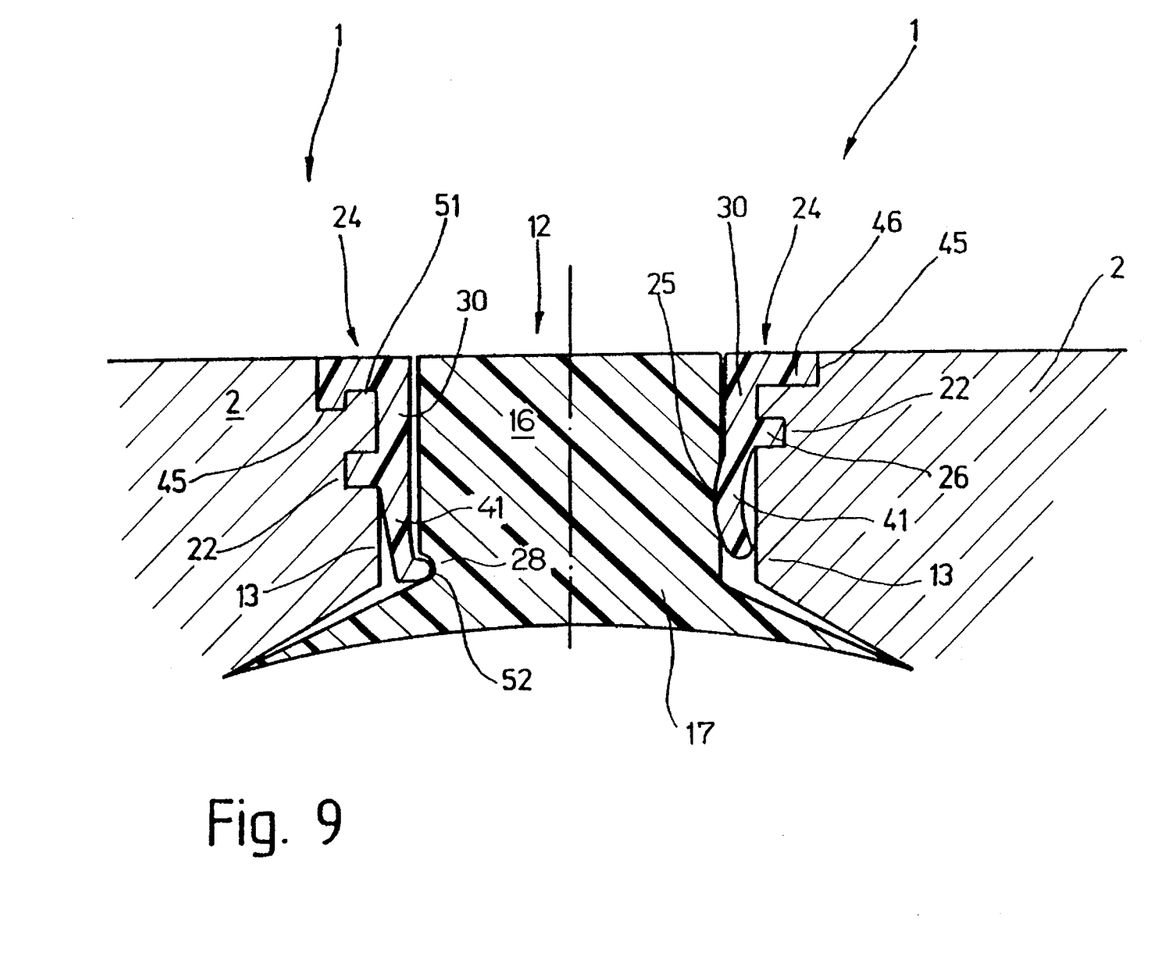
FIG. 9 shows the linear drive according to FIG. 2, in which the profile element is held in two grooves extending parallel to one another.

A further embodiment is shown in the left-hand half of FIG. 9. Here, the open-edged groove 45 is provided, on its side adjacent to the flank 13, with a longitudinally extending projection 51, so that, as seen from the longitudinal slot 12, an undercut is obtained in the groove 45. The profile element 24 bears in both grooves 22, 45 and is aligned both with the outside of the guide tube 2 and with the outer side of the sealing band 16. The lip or tongue 41 extends from the portion of the profile element held fixedly by the grooves 22, 45, in the direction of the piston 4 in an approximately radial direction. The lip 41 does not bear on the flank 13, but projects from this in the longitudinal slot 12.

The lip 41 is provided on the end face with the catch nose 52 which extends over its entire length and which is located in the here flute-shaped longitudinal recess 28, with the result that the sealing band 16 is caught together with the guide tube 2. Run-on protection is ensured, here, by the run-on portion 30 extending between the grooves 22, 45.

The linear drive 1 shown on the right in FIG. 9 is largely identical to that shown on the left, the undercut in the open-edged groove 45 having been dispensed with. Moreover, the flexible lip 41 is of curved design, so that it is supported with its free end on the flank 13. It is arched into the longitudinal slot 12, this projecting portion forming the catch portion 25 which, here, is approximately in the form of a segment of a circle.

Figure 10:
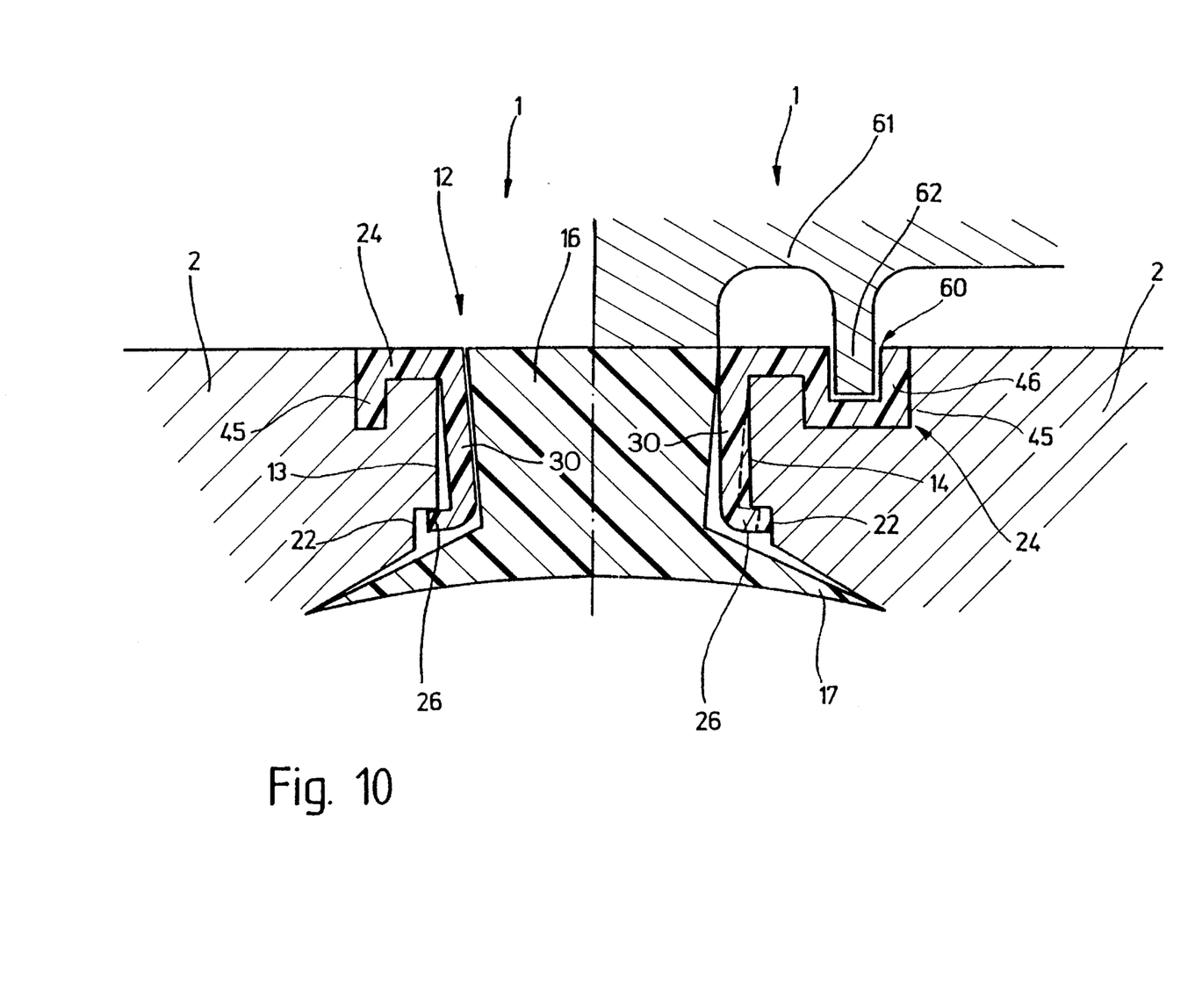
FIG. 10 shows the linear drive according to FIG. 2, in which the profile element seated in two mutually parallel grooves completely covers the flank of the longitudinal slot, in two embodiments, an additional sealing-off means designed as a labyrinth seal being provided in one embodiment.

In the exemplary embodiments of the linear drive 1 which are shown in FIG. 10, an especially secure fastening of the profile element 24 is ensured by an undercut in the open-edged groove 45. In both exemplary embodiments, the groove 22 is likewise designed as an open-edged groove. The resiliently designed run-on portion 30 extends from the portion of the profile element 24 located in the groove 45 in the direction of the open-edged groove 22, into which it engages with a short portion. The run-on portion 30 is pretensioned resiliently away from the flank 13, so that a catch effect is obtained for the trapezoidally designed portion of the sealing band 16 located in the longitudinal slot. Moreover, good run-on protection is achieved.

In the linear drive 1 shown on the right in FIG. 10, the profile element 24 has, on the portion 46 located in the groove 45, a sealing groove 60 opened outward. The sealing groove 60 forms, with a projection provided on a covering band 61 or a slide, a labyrinth seal. An additional improved sealing-off of the linear drive 1 is thereby achieved.

In any of its embodiments, the profile element 24 can be used as a run-on protection element both on linear drives 1 actuated by pressure medium and on those linear drives which are driven by a pull means, screw-spindle mechanisms or racks.

While the invention has been disclosed with reference to certain exemplary embodiments, numerous changes, alterations, and modifications to the exemplary embodiments are possible without departing from the spirit and scope of the invention, as defined in the appended claims and equivalents thereof.

What is claimed is:

1. A linear drive, comprising:
   a guide tube having a longitudinal slot defined by mutually parallel flanks located opposite one another and by closing device seated on end faces of the guide tube;
   a piston mounted in the guide tube and displaceable in a longitudinal direction;
   a web which passes through the longitudinal slot and which is connected to the piston;
   a profile element having a substantially rigid run-on portion and provided on each flank of the longitudinal slot, the profile element projecting at least partially beyond the flank;
   wherein the run-on portion extends an entire longitudinal length of the logical slot and includes a run-on face such that when a lateral load is applied to the web in a direction of a flank, the web bears on the run-on face which forms an abutment and prevents the web from coming into contact with the flank.

2. The linear drive as claimed in claim 1, wherein each flank includes at least one groove wherein a portion of a profile element is seated.

3. The linear drive as claimed in claim 1, wherein the run-on portion is mounted resiliently relative to a stop.

4. The linear drive as claimed in claim 1, wherein the run-on portion is mounted fixedly in relation to the flank of the longitudinal slot.

5. The linear drive as claimed in claim 1, wherein the run-on portion bears on the flank.

6. The linear drive as claimed in claim 1, wherein the run-on portion is pretensioned resiliently away from the flank.

7. The linear drive as claimed in claim 1, wherein the run-on portion completely covers the flank.

8. The linear drive as claimed in claim 1, wherein the run-on portion has low elasticity such that the web has firm bearing contact with and presses into the profile element only slightly thereby reducing friction which occurs as a result of flexing of the profile element during linear movement of the web.

9. The linear drive as claimed in claim 1, wherein the run-on face includes a planar surface.

10. The linear drive as claimed in claim 1, wherein the run-on face is arranged essentially parallel to the flank.

11. A linear drive, comprising:
    a guide tube having a longitudinal slot defined by mutually parallel flanks located opposite one another and by closing devices seated on end faces of the guide tube;
    a piston mounted in the guide tube and displaceable in a longitudinal direction;
    a web which passes through the longitudinal slot and which is connected to the piston;
    a profile element having a run-on portion and provided on each flank of the longitudinal slot, the profile element projection at least partially beyond the flank; and
    a sealing band for sealing the longitudinal slot wherein the profile element includes a catch portion for catching the sealing band;
    wherein the run-on portion includes a run-on face such that when a lateral load is applied to the web in a direction of a flank, the web bears on the run-on face which forms an abutment and prevents the web from coming into contact with the flank.

12. The linear drive as claimed in claim 11, wherein the profile element includes a longitudinal rib which extends over a length of the profile element, the sealing band includes a longitudinal recess in a side of the sealing band facing the flank, and the longitudinal recess receives the longitudinal rib.

13. The linear drive as claimed in claim 11, wherein the catch portion is mounted resiliently in a direction toward the flank and is pretensioned resiliently away from the flank.

14. The linear drive as claimed in claim 1, wherein the profile element is made from plastic.

15. A linear drive, comprising:
    a guide tube having a longitudinal slot defined by mutually parallel flanks located opposite one another and by closing devices seated on end faces of the guide tube;
    a piston mounted in the guide tube and displaceable in a longitudinal direction;
    a web which passes through the longitudinal slot and which is connected to the piston; and
    a profile element having a run-on portion and provided on each flank of the longitudinal slot, the profile element projecting at least partially beyond the flank;
    wherein the run-on portion includes a run-on face such that when a lateral load is applied to the web in a direction of a flank, the web bears on the run-on face which forms an abutment and prevents the web from coming into contact with the flank;
    wherein each flank includes at least one groove wherein a portion of a profile element is seated; and
    wherein the groove includes at its mouth a second portion having parallel flank and, adjacent the second portion, a third portion wherein the groove first increase in width and then decreases in width.

16. The linear drive as claimed in claim 15, wherein the portion of the profile element includes two legs.

17. The linear drive as claimed in claim 11, wherein the catch portion includes a resilient lip which projects with an inclination relative to the flank in a direction toward the sealing band.

18. The linear drive as claimed in claim 11, wherein a side of the sealing band facing the piston is planar.

19. The linear drive as claimed in claim 11, wherein the web is forked and connects the piston to an outer driven member and wherein the sealing band is received in the fork of the web.

20. The linear drive as claimed in claim 11, further comprising a guide device wherein in a middle region of the piston the sealing band is drawn away from the longitudinal slot by the guide device.

* * * * *

UNITED STATES PATENT AND TRADEMARK OFFICE
CERTIFICATE OF CORRECTION

PATENT NO.   : 5,517,901
DATED        : May 21, 1996
INVENTOR(S)  : Reinhard LIPINSKI It is certified that error appears in the above-indentified patent and that said Letters Patent is hereby corrected as shown below:

On the title page, item [73], "Machimpex" should read --Maschimpex--;
    and "Rotkruez" should read --Rotkreuz--

Signed and Sealed this

Twenty-eighth Day of July, 1998

Attest:

BRUCE LEHMAN

Attesting Officer           Commissioner of Patents and Trademarks